United States Patent
Gaviria

(10) Patent No.: US 9,781,167 B2
(45) Date of Patent: Oct. 3, 2017

(54) WEBRTC DATA CHANNEL FACILITATING IMS SUPPORT OF RCS FEATURES

(71) Applicant: Verizon Patent and Licensing Inc., Arlington, VA (US)

(72) Inventor: Rafael A. Gaviria, Medford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 766 days.

(21) Appl. No.: 13/924,392

(22) Filed: Jun. 21, 2013

(65) Prior Publication Data

US 2014/0379931 A1 Dec. 25, 2014

(51) Int. Cl.
*G06F 15/16* (2006.01)
*H04L 29/06* (2006.01)
*H04L 29/08* (2006.01)

(52) U.S. Cl.
CPC ........ *H04L 65/1016* (2013.01); *H04L 65/104* (2013.01); *H04L 65/1069* (2013.01); *H04L 67/02* (2013.01)

(58) Field of Classification Search
CPC .. H04L 65/1016; H04L 65/1069; H04L 67/02
See application file for complete search history.

(56) References Cited

U.S. PATENT DOCUMENTS

| | | | | |
|---|---|---|---|---|
| 2014/0259127 A1* | 9/2014 | Shaw | .................. | H04L 63/0884 726/5 |
| 2014/0379931 A1* | 12/2014 | Gaviria | ........................ | 709/227 |
| 2015/0172879 A1* | 6/2015 | Vaidya | .................. | H04W 4/003 455/466 |

OTHER PUBLICATIONS

Tanenbaum, Andrew S., Computer Networks, Fourth Edition. Prentice Hall PTR (2003).*
W3C WebRTC Working Group, WebRTC 1.0: Real-time Communication Between Browsers, W3C Working Draft, Feb. 9, 2012.*
GSMA, Rich Communication Suite 5.0 Advanced Communications Services and Client Specification Version 1.0, Apr. 19, 2012.*
3rd Generation Partnership Project, "Technical Specification Group Services and System Aspects; Service requirements for the Internet Protocol (IP) Multimedia core network Subsystem (IMS); Stage 1 (Release 12)," 3GPP TS 22.228 V12.5.0, Mar. 2013.
3rd Generation Partnership Project, "Technical Specification Group Services and System Aspects; IP Multimedia Subsystem (IMS); Stage 2 (Release 12)," 3GPP TS 23.228 V12.0.0, Mar. 2013.

(Continued)

*Primary Examiner* — Hitesh Patel

(57) ABSTRACT

A gateway may be configured to establish a first data connection between the gateway device and a client device. The first data connection may be based on a Web Real-Time Communication application programming interface. The gateway may establish a second data connection between the gateway device and an Internet Protocol ("IP") Multimedia Subsystem ("IMS") core; and facilitate communications, that are based on a Rich Communication Services ("RCS") standard, between the client device and the IMS core. Facilitating the communications may include outputting communications, that are based on communications received from the client device via the first data connection, to the IMS core via the second data connection, and outputting communications, that are based on communications received from the IMS core via the second data connection, to the client device via the first data connection.

20 Claims, 9 Drawing Sheets

(56) References Cited

OTHER PUBLICATIONS

Bergkvist, et al., "WebRTC 1.0: Real-time Communication Between Browsers; W3C Editor's Draft," Jun. 3, 2013 (available at http://dev.w3.org/2011/webrtc/editor/webrtc.html).
Global System for Mobile Association, "Rich Communications Suite 5.1 Endorsement of 3GPP TS 29.311 Service level Interworking for Messaging Services Version 1.0," Aug. 13, 2012.
Global System for Mobile Association, "Rich Communication Suite 5.1 Advanced Communications Services and Client Specification Version 2.0," May 3, 2013.
Global System for Mobile Association, "Rich Communication Suite 5.1 Endorsement of OMA SIP/SIMPLE IM 1.0 Version 1.0," Aug. 13, 2012.
Global System for Mobile Association, "Rich Communication Suite 5.1 Endorsement of OMA CPM 1.0 Conversation Functions Version 1.0," Aug. 13, 2012.
Global System for Mobile Association, "Rich Communication Suite 5.1 Endorsement of OMA CPM 1.0 Interworking Version 1.0," Aug. 13, 2012.
Global System for Mobile Association, "Rich Communication Suite 5.1 Endorsement of OMA CPM 1.0 Message Storage Version 1.0," Aug. 13, 2012.
Rosenberg et al., "SIP: Session Initiation Protocol," RFC 3261, Jun. 2002 (available at http://http://tools.ietf.org/html/rfc3261).
Campbell et al., "The Message Session Relay Protocol (MSRP)," RFC 4975, Sep. 2007 (available at http://tools.ietf.org/html/rfc4975).

\* cited by examiner

WEBRTC DATA CHANNEL FACILITATING IMS SUPPORT OF RCS FEATURES

BACKGROUND

Computer systems provide techniques for users to communicate with each other. One example system may make use of an Internet Protocol ("IP") Multimedia Subsystem ("IMS") core (e.g., as standardized by the Third Generation Partnership Project ("3GPP")), which may facilitate the use of IP protocols for communications, such as telephony, fax, e-mail, voice over IP ("VoIP"), instant messaging, video messaging, and/or other services. Some communication standards (such as the Rich Communications Suite ("RCS"), developed by the Global System for Mobile Communications Association ("GSMA")) may provide enhanced communications features, such as address books, presence information, file transfer, syncing, and/or other features.

DETAILED DESCRIPTION OF PREFERRED EMBODIMENTS

The following detailed description refers to the accompanying drawings. The same reference numbers in different drawings may identify the same or similar elements.

RCS protocols may provide advanced messaging features, such as centralized address books, presence information, file transfer, syncing (e.g., syncing of settings, messages, and/or other information across multiple devices), and/or other features. One common technique of providing RCS capability to users has been to provide web pages that provide RCS features. These web pages may periodically request information from (or "poll") a web server in order to provide RCS functionality.

For example, assume that a particular web page provides an RCS-based instant messaging client. Commonly, the web page may include code (e.g., JavaScript code, HyperText Markup Language ("HTML") code, and/or other code) that causes a web browser, that displays the web page, to periodically send HyperText Transfer Protocol ("HTTP") GET requests to a web server. In some instances, the web server may respond with a new instant message for the web browser; however, in most cases, the web server may not provide a new instant message, or may even respond with an indication that no new messages are available for the web browser. Performing such periodic polling may be inefficient, in that excessive processing power and network resources may be spent for relatively little useful data.

Figure 1:
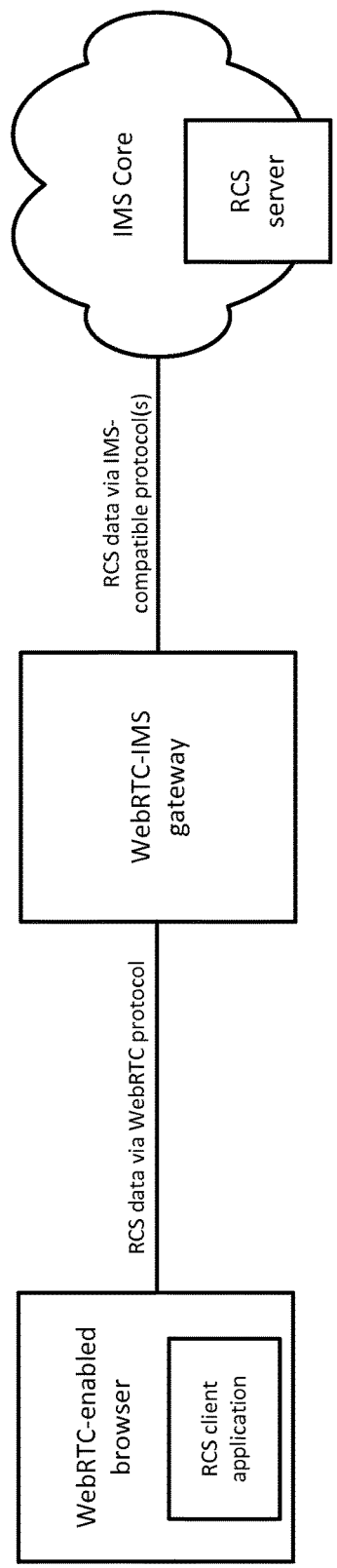
FIG. 1 illustrates an overview of one or more example implementations described herein.

Techniques described herein may allow RCS-based applications to operate seamlessly with an IMS core, thus streamlining the control signaling used to provide RCS features. For instance, as shown in FIG. 1, some implementations may utilize a WebRTC data connection from a WebRTC-enabled browser (e.g., a browser that is configured to implement a WebRTC application programming interface ("API"), running a RCS application, to a gateway (shown in FIG. 1 as "WebRTC-IMS gateway," or "WGW" as also referred to herein)). The WebRTC data connection may be used to send RCS data related to the RCS application (e.g., instant messaging data, video call data, address book data, etc.) to and/or from the WebRTC-enabled browser. Because of the nature of the WebRTC data connection, the WebRTC-enabled browser may be capable of sending and/or receiving RCS data using relatively lightweight WebRTC protocols. That is, for example, instead of periodically or intermittently polling a web server for new RCS data (e.g., by repeatedly sending HTTP GET requests), RCS data may be "pushed" to the WebRTC browser via the WebRTC connection. Thus, the WebRTC-enabled browser may consume less network and/or processing resources to implement the RCS application.

The above-mentioned gateway may also be in communication with an IMS core, which may include (or be in communication with) a RCS server. The RCS server may be capable of providing relevant RCS information to the browser (e.g., incoming instant messages, address book data, etc.), as well as processing RCS information received from the browser (e.g., outgoing instant messages, modifications to an address book, etc.). In some situations, the IMS core, and/or the RCS server, may not inherently include the capability to communicate via a WebRTC data connection (e.g., may not implement a WebRTC API), but may include the capability to communicate via one or more other messaging schemes (e.g., Session Initiation Protocol ("SIP"), Message Session Relay Protocol ("MSRP"), and/or another protocol).

In some implementations, the WGW may allow RCS communications, sent from the browser, to be received by the IMS core, and vice versa. For example, as shown in FIG. 1, the WGW may receive RCS data from the browser via a data connection according to a WebRTC protocol. The WGW may translate the received data (e.g., perform an encapsulation and/or decapsulation process) into a protocol that is implemented by the IMS core, such as SIP and/or MSRP. The WGW may, in turn, output the translated data (e.g., some or all of the original RCS data, encapsulated in one or more SIP and/or an MSRP messages) to the IMS core, which may provide the data to the RCS server. Similarly, the WGW may receive RCS data from the IMS core, via SIP and/or MSRP, and may provide the RCS data (e.g., after removing the SIP and/or MSRP data) to the browser.

Figure 2:
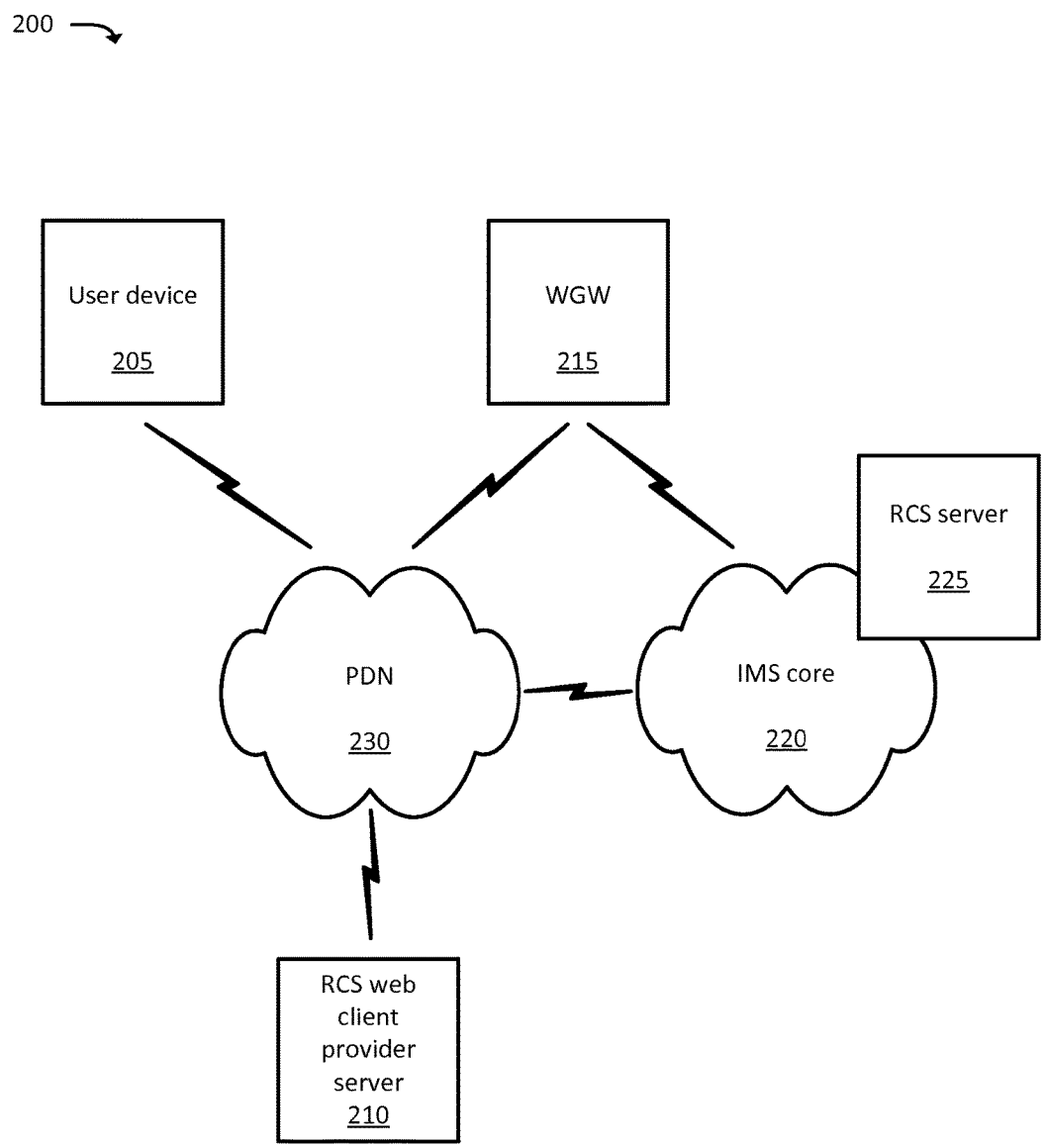
FIG. 2 illustrates an example environment in which systems and/or methods, described herein, may be implemented.

FIG. 2 illustrates an example environment 200, in which systems and/or methods described herein may be implemented. As shown in FIG. 2, environment 200 may include user device 205, RCS web client server 210, WGW 215, IMS core 220, RCS server 225, and packet data network ("PDN") 230.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

User device 205 may include any computation and communication device that is capable of communicating with one or more networks, such as PDN 230. In some implementations, user device 205 may communicate with PDN 230 via one or more access networks, such as a radio access network "RAN"). User device 205 may include, for example, a desktop computer, a laptop computer, a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a tablet computer, a camera, a personal gaming system, or another type of computation and communication device. As described further below, user device 205 may execute one or more software applications, such as a web browser that is capable of communicating via data connections (e.g., a data connection that is based on a WebRTC API).

RCS web client server 210 may include any computation and communication device that provides a RCS web client to requesting devices. For example, as described below, RCS web client server 210 may, in response to an HTTP request received from user device 205, provide a web page to user device 205. As described further below, the web page may include an RCS client and/or other information (e.g., JavaScript code, or other code) that may facilitate user device 205 establishing a data connection with WGW 215. RCS web client server 210 may include, in some implementations, a server-grade computer system. In some implementations, RCS web client server 210 may include another type of device, such as a desktop computer, a laptop computer, a radiotelephone, a PCS terminal, a PDA, a smart phone, a tablet computer, a camera, a personal gaming system, or another type of computation and communication device. In some implementations, RCS web client server 210 may be a traditional web-accessible HTTP file server.

WGW 215 may include any computation and communication device that, as further described below, facilitates communication between user device 205 and IMS core 220. Briefly, for example, WGW 215 may establish a data connection with user device 205 (e.g., a WebRTC data connection established via PDN 230), and may also establish a data connection with IMS core 220 (e.g., via PDN 230, via a direct connection with one or more devices of IMS core 220, etc.). Via these connections, WGW 215 may facilitate communication between user device 205 and IMS core 220. WGW 215 may include a direct and/or indirect connection to user device 205 and/or IMS core 220. In some implementations, WGW 215 may be incorporated as part of IMS core 220, may connected to IMS core 220 via PDN 230, or may communicate with IMS core 220 in another fashion.

In some implementations, WGW 215 may be capable of communicating via messages and connections that are based on a WebRTC API. In some implementations, WGW 215 may additionally, or alternatively, be capable of communicating using MSRP messaging (e.g., as described in Campbell, B., Ed., Mahy, R., Ed., and C. Jennings, Ed., "The Message Session Relay Protocol (MSRP)", RFC 4975, September 2007) and/or SIP messaging (e.g., as described in Rosenberg, J., Schulzrinne, H., Camarillo, G., Johnston, A., Peterson, J., Sparks, R., Handley, M., and E. Schooler, "SIP: Session Initiation Protocol", RFC 3261, June 2002).

IMS core 220 may include one or more computation and communication devices that implement IMS functionality of a long term evolution ("LTE") network. IMS core 220 may include, for example, one or more Call Session Control Function ("CSCF") devices, a Home Subscriber Server/Authentication, Authorization, and Accounting ("HSS/AAA") server, and/or other devices. The CSCF may facilitate the establishment and de-establishment of media sessions. The CSCF may communicate with devices outside of IMS core 220 using, for example, SIP and/or MSRP messages. The HSS/AAA server may assist in the provisioning of network resources for IMS subscribers and IMS-based services.

In one implementation, IMS core 220 may conform to, or be otherwise based on, a standard provided by 3GPP (e.g., as defined, in part, by the documents titled "Technical Specification Group Services and System Aspects; IP Multimedia Subsystem (IMS); Stage 2 (Release 12)," 3GPP TS 23.228 v12.0.0, March 2013; and "Technical Specification Group Services and System Aspects; Service requirements for the Internet Protocol (IP) Multimedia core network Subsystem (IMS); Stage 1 (Release 12)," 3GPP TS 22.228 v12.5.0, March 2013). In some implementations, IMS core 220 may be based on additional, or different standards (e.g., earlier and/or later versions of the above-mentioned documents pertaining to IMS, and/or different standards entirely).

RCS server 225 may include one or more computation and communication devices that provide RCS features to one or more other devices. Some examples of RCS features, that may be provided by RCS server 225, are specified in standards provided by the GSMA, such as the document titled "Rich Communication Suite 5.1 Advanced Communications Services and Client Specification Version 2.0." These standards may include, for example, instant messaging, file transfer, file transfer, phone book sync, presence, and/or other features. In some implementations, the features provided by RCS server 225 may be based on additional, or different standards (e.g., earlier and/or later versions of the above-mentioned document pertaining to RCS, and/or different standards entirely).

In some implementations, and as shown, RCS server 225 may be implemented as part of IMS core 220. That is, in some such implementations, RCS server 225 may be deployed by, operated by, and/or owned by the same entity that deploys, operates, or owns IMS core 220. In some such implementations, RCS server 225 may be directly connected to one or more devices of IMS core 220. In some implementations, RCS server 225 may communicate with IMS core 220 via one or more other networks, such as via a connection (not illustrated) with PDN 230.

Network 230 may include one or more wired and/or wireless networks. Network 230 may include, for example, a wide area network ("WAN") such as the Internet, or one or more other networks. User device 205 may connect, through PDN 230, to other networks, data servers, applications servers, or other servers/applications that are coupled to network 230.

Although not explicitly shown, environment 200 may include an evolved packet system ("EPS") that includes a LTE network and/or an evolved packet core ("EPC") network that operate based on a 3GPP wireless communication standard. The LTE network may be, or may include, a radio access network ("RAN") that includes one or more base stations, some or all of which may take the form of an evolved node B ("eNB"), via which user device 205 may communicate with the EPC network. The EPC network may include one or more serving gateways ("SGWs"), packet data network ("PDN") gateways ("PGWs"), and/or mobility management entities ("MMEs"), and may enable user device 205 to communicate with PDN 230 and/or IMS core 220.

Figure 3:
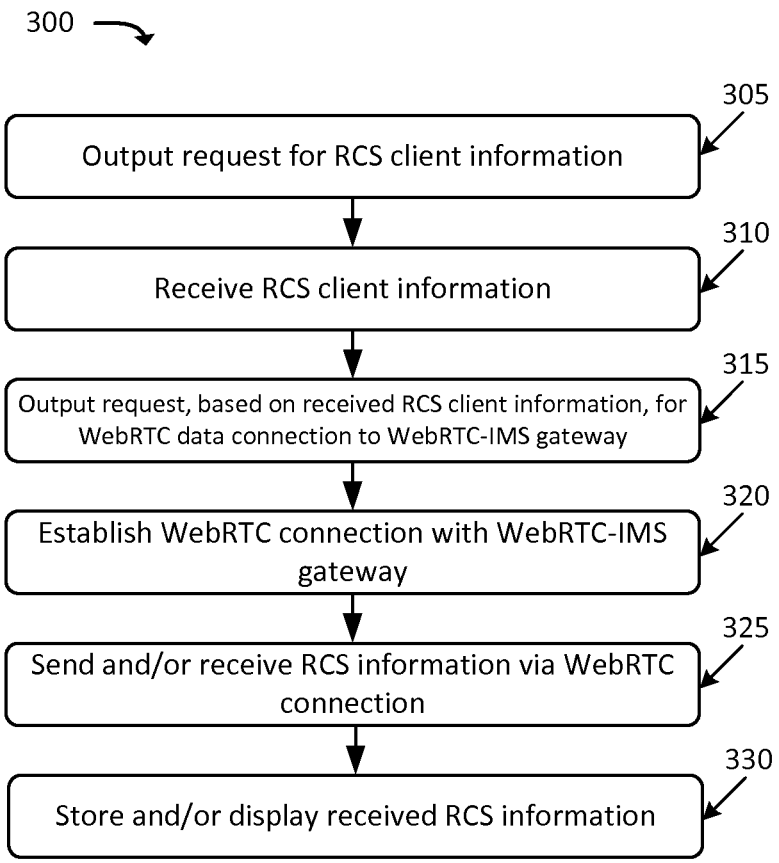
FIGS. 3 and 4 illustrate example processes for sending and/or receiving RCS information to and/or from an IMS core via a Web Real-Time Communication ("WebRTC") connection with a WebRTC-IMS gateway.

FIG. 3 illustrates an example process 300 for sending and/or receiving RCS information to and/or from an IMS core via a WebRTC data connection with a WGW. In one example implementation, process 300 may be performed by user device 205. In other implementations, some or all of process 300 may be performed by one or more other devices in lieu of, or in conjunction with, user device 205.

Process 300 may include outputting a request for RCS client information (block 305). For example, user device 205 may make a request (e.g., an HTTP request), to RCS web client server 210, to access a web page provided by RCS web client server 210. The request may include, for example, a location identifier (e.g., a Uniform Resource Locator ("URL")) of the web page.

The RCS client information, requested at block 305, may include information necessary for user device 205 to provide RCS functionality to a user of user device 205. For example, the RCS client information may include one or more user interface components (e.g., text entry fields, text display fields, buttons, etc.) that may be useful for representing a RCS client, such as an instant messaging client, a video conferencing client, etc. As mentioned above, the RCS client may implement features such as presence information (e.g., availability of the user), address book, file transfer, content sharing, and/or other RCS features. As mentioned above, some examples of RCS features are provided in standards provided by the GSMA.

Process 300 may also include receiving RCS client information (block 310). For example, user device 205 may receive, in response to the request made at block 305, a web page from RCS web client server 210. The web page may include code (e.g., JavaScript code and/or HTML code) that may represent a RCS client. In some implementations, the web page may also include an instruction to request the establishment of a data connection (e.g., a WebRTC data connection) to WGW 215. The received information may, in some implementations, include location information for WGW 215 (e.g., an IP address), which may be used by user device 205 in order to communicate with WGW 215.

Some examples of instructions, to establish a data channel, are specified in application programming interfaces ("APIs") provided by the World Wide Web Consortium ("W3C"), such as the technical document by Bergkvist, Adam; Burnett, Daniel; Jennings, Cullen; Narayanan, Anant; titled "WebRTC 1.0: Real-time Communication Between Browsers—W3C Editor's Draft 3 Jun. 2013." Referring to this document, the instruction to request the establishment of the data connection may include, for instance, an instruction to execute a WebRTC "createDataChannel( )" process, which may lead to the creation of a WebRTC "DataChannel" object at user device 205 and WGW 215. As described below, the "DataChannel" object may be defined, by the WebRTC API, as including a set of processes (e.g., "void send (DOMString data);" "void send (ArrayBuffer data);" "void send (Blob data);" or other processes) that may facilitate the sending of data via the data channel.

In some implementations, user device 205 may include the capability to implement the WebRTC API. For instance, a web browser application, running on user device 205, may be a WebRTC-enabled browser. That is, the web browser may be designed to implement some or all of the functionality specified in the WebRTC API.

Process 300 may additionally include outputting a request, based on the received RCS client information, for a WebRTC data connection to the WGW (block 315). For example, using the location information, included in the information received at block 310, user device 205 may output a request to WGW 215 to establish a WebRTC data connection. As mentioned above, this request may include, for instance, the invocation of a "createDataChannel" process in order to create a "DataChannel" object at user device 205 and WGW 215, via which user device 205 and WGW 215 may send and/or receive data to and/or from each other.

Process 300 may further include establishing a WebRTC data connection with the WGW (block 320). For instance, based on this request sent at block 315, a data connection (e.g., a WebRTC "DataChannel") may be established between user device 205 and WGW 215.

Process 300 may also include sending and/or receiving RCS information via the WebRTC data connection (block 325). For example, user device 205 may send RCS information, via the data connection established at block 320, by invoking a WebRTC "send" process (e.g., "void send (DOMString data);" etc.) when data is to be sent. When sending data via the WebRTC data connection, user device 205 may send RCS data, generated by the RCS client. For example, assume that a user, of user device 205, enters an instant message, via the RCS client, to be sent. User device 205 may send RCS information, including the instant message, to WGW 215, via the WebRTC data channel.

As another example, WGW 215 may send RCS information to user device 205 via the data connection established at block 320. Similar to the process described above, WGW 215 may invoke a WebRTC "send" process when data is to be sent to user device 205. The RCS information, to be sent to user device 205, may correspond to RCS information received from IMS core 220.

Process 300 may additionally include storing and/or displaying received RCS information (block 330). For example, user device 205 may store or display RCS information received via the established data channel. For instance, assume that received RCS information corresponds to an incoming instant message. In this situation, user device 205 may display the incoming instant message via, for example, the WebRTC-enabled web browser application.

Figure 4:
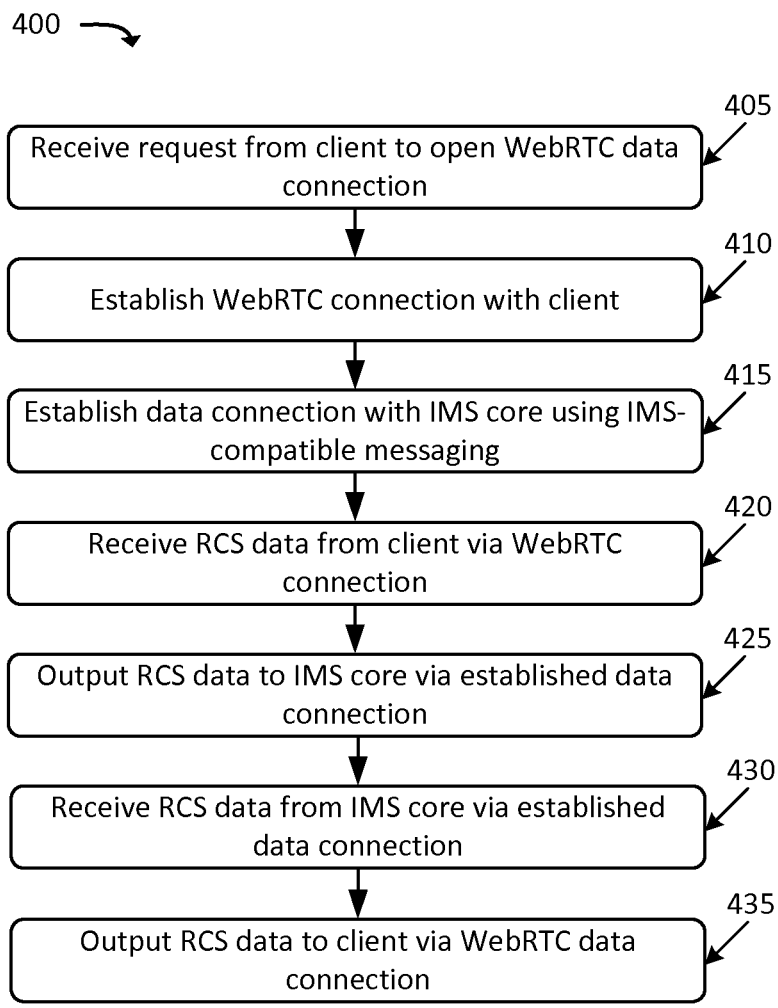

FIG. 4 illustrates another example processes for sending and/or receiving RCS information to and/or from an IMS core via a WebRTC connection with a WebRTC-IMS gateway. In one example implementation, process 400 may be performed by WGW 215. In other implementations, some or all of process 400 may be performed by one or more other devices in lieu of, or in conjunction with, WGW 215. FIG. 4 is described below in connection with FIGS. 5A-5C.

Process 400 may include receiving a request from a client to open a WebRTC data connection (block 405). For instance, WGW 215 may receive a request from a client (e.g., a WebRTC-enabled client running on user device 205) to open a data connection. In some implementations, this request may be received via PDN 230. As discussed above, this request may be sent from user device 205 based on information received from RCS web client server 210. As also mentioned above, the WebRTC request may be based on the invocation of a "createDataChannel( )" process, as defined by a WebRTC standard.

Process 400 may also include establishing a WebRTC data connection with the client (block 410). For instance, WGW 215 may establish a WebRTC with user device 205. As mentioned above, this data connection may correspond to a WebRTC "DataChannel" object, with user device 205 and WGW 215 indicated as termination points for the data connection. As also mentioned above, this data connection may allow user device 205 and WGW 215 to send and receive data to each other without periodically or intermittently polling each other in order to determine whether data is to be sent from one to the other.

Process 400 may further include establishing a data connection with an IMS core using IMS-compatible messaging (block 415). In some implementations, WGW 215 may establish a data connection with the IMS core concurrently with, after, or otherwise in response to receiving (at block 405) a request from the client to open a WebRTC connection with the client. In some implementations, WGW 215 may establish (at block 415) a data connection with the IMS core independent of (e.g., before, or otherwise not in response to) receiving the request from the client to open the WebRTC connection.

For example, WGW 215 may establish a data connection with IMS core 220 using one or more messaging protocols that IMS core 220 is designed to interpret. In some implementations, the data connection may be, or may include, an SIP data connection. For instance, WGW 215 may send a SIP INVITE message to IMS core 220. The SIP INVITE message may indicate that WGW 215 and IMS core 220 (or, in some implementations, a device within or in communication with IMS core 220, such as RCS server 225) are termination points of the data connection. For example, in some implementations, the SIP INVITE message may include a "From" field, which may include information (e.g., an IP address) identifying WGW 215, and a "To" field, which may include information identifying RCS server 225.

Process 400 may additionally include receiving RCS data from the client via the WebRTC connection (block 420). The RCS data may be, for example, messages related to RCS functions. For example, the RCS data may include instant messages sent from the client, modifications to an address book made at the client, or other data relating to RCS features. In some implementations, the RCS data may be sent, by the client and to WGW 215, using SIP and/or MSRP messaging protocols. In some implementations, the RCS data may be sent to WGW 215 using one or more other protocols (e.g., a proprietary protocol and/or a different protocol than SIP or MSRP). The RCS data may, in some implementations, include information, such as header information, identifying the client (e.g., an IP address and port associated with user device 205) as the sender of the RCS data, and information identifying WGW 215 (e.g., an IP address and port associated with WGW 215) as a recipient of the RCS data.

Figure 5A:
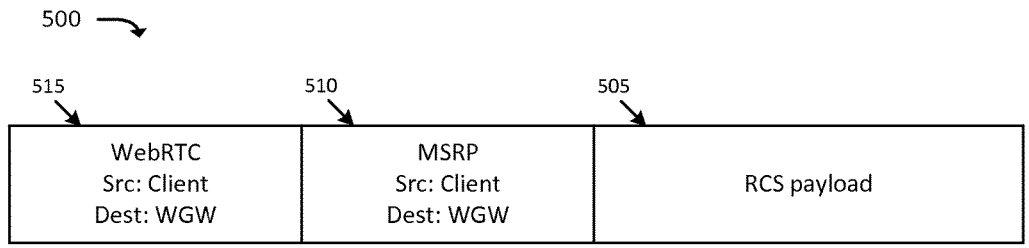
FIG. 5A illustrates an example of data sent from a client to a WebRTC-IMS gateway.

FIG. 5A illustrates an example of RCS data (e.g., data packet 500) that may be received (at block 420) from the client. As shown, data packet 500 may include RCS payload 505, MSRP information 510, and WebRTC information 515. RCS payload 505 may include data relating to RCS services (e.g., an instant message sent from user device 205, etc.). MSRP information 510 may be in a format that conforms to, or is based on, a MSRP standard (e.g., as described in RFC 4975, referenced above). MSRP information 510 may include information (e.g., IP address, port, and/or other identifiers) that indicates that the source of the data is the client (e.g., user device 205), and that RCS payload 505 is intended for WGW 215. WebRTC information 515 may include information that indicates that the source of data packet 500 is the client (e.g., user device 205), and that data packet 500 is intended for WGW 215. Based on WebRTC information 515, data packet 500 may be sent from user device 205 to WGW 215.

Returning to FIG. 4, process 400 may also include outputting the RCS data to the IMS core via the established data connection with the IMS core (block 425). For instance, WGW 215 may output the RCS data (received at block 420) to RCS server 225, via the connection established at block 415. In some implementations, when outputting (at block 425) the RCS data to RCS server 225, WGW 215 may modify the RCS data (e.g., add, modify, and/or remove some of the RCS data received at block 420).

Figure 5B:
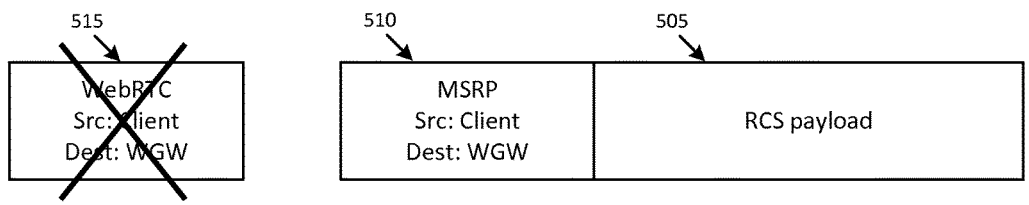
FIGS. 5B and 5C illustrates an example of a portion of the data, shown in 5A, being prepared for sending to a RCS server.
Figure 5C:
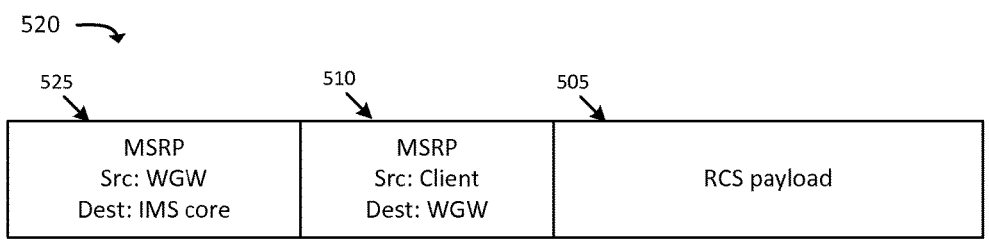

For instance, referring to FIG. 5B, WGW 215 may remove, or "strip," WebRTC information 515 from data packet 500, to yield a modified data packet. As shown in FIG. 5C, WGW 215 may add MSRP information 525 to the modified data packet, thus resulting in further modified data packet 520. MSRP information 525 may indicate that the source of data packet 520 is WGW 215, and that the destination of data packet 520 is IMS core 220 or, in some implementations, RCS server 225. In some implementations, WGW 215 may determine the destination of data packet 520 based on a configuration of WGW 215 (e.g., WGW 215 may have been configured to forward packets, received from clients, to IMS core 220 or to RCS server 225).

Returning to FIG. 4, process 400 may further include receiving RCS data from the IMS core via the established data connection with the IMS core (block 430). For example, WGW 215 may receive RCS data, which is intended for user device 205, from RCS server 225. The RCS data may include, for instance, an instant message for user device 205, an address book update for user device 205, and/or data relating to another RCS function. The data received (at block 430) may be similar to data packet 520, shown in FIG. 5C, except the sources, shown in the figure, may be switched with the destinations (e.g., the source of MSRP information 510 may be IMS core 220, and the destination may be user device 205; and the source of MSRP information 525 may be IMS core 220, and the destination may be WGW 215).

Process 400 may additionally include outputting the RCS data to the client via the WebRTC data connection (block 435). For instance, WGW 215 may strip some information from the RCS data received at block 430 (e.g., as similarly shown in FIG. 5B), and may add additional information to cause the data to be sent to user device 205. For instance, WGW 215 may add WebRTC information, indicating that a source of the data is WGW 215 and a destination of the data is user device 205.

Figure 6A:
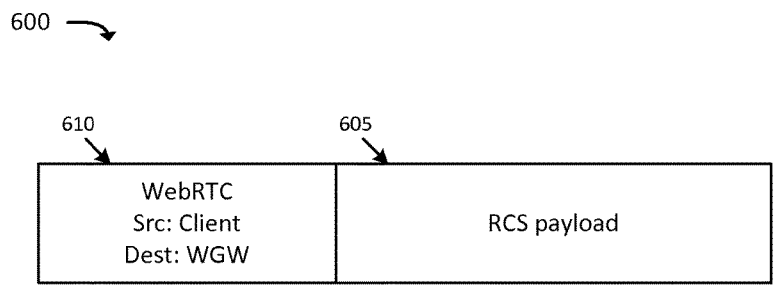
FIGS. 6A and 6B conceptually illustrate another example of sending RCS data from a client to an RCS server.
Figure 6B:
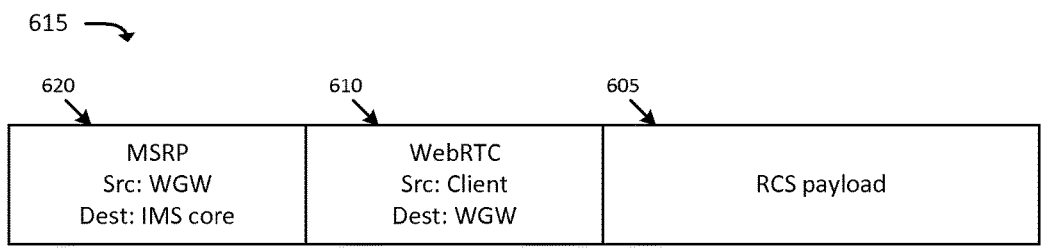

While FIG. 4 and FIGS. 5A-C illustrated one example implementation of sending data between user device 205 and RCS server 225, in practice, other variations are possible. FIGS. 6A and 6B conceptually illustrate another technique of sending RCS data from user device 205 to RCS server 225. As shown in FIG. 6A, data packet 600 may include RCS payload 605 and WebRTC information 610.

Data packet 600 may be received by WGW 215, from user device 205 (e.g., at block 420). As may be apparent from this figure, one difference between data packet 600 and data packet 500 is that data packet 600 may not include information indicating that user device 205 is the source of the data, and that RCS server 225 is the destination (e.g., does not include MSRP information 510).

FIG. 6B illustrates data packet 615, which may correspond to data sent from WGW 215 to RCS server 225 at block 425. As shown, data packet 615 may include some or all of the information included in data packet 600, with additional MSRP information 620. MSRP information 620 may indicate that the source of data packet 620 is WGW 215, and that the destination is RCS server 225. In some implementations, RCS server 225 may determine that RCS server 225 is the destination of data packet based on, for example, a configuration of WGW 215. For instance, WGW 215 of some implementations may be configured to add MSRP information 620 to data received from clients, and to forward the modified data to RCS server 225. In this manner, user device 205 may be able to carry on RCS communications via WebRTC, without using SIP or MSRP signaling.

Figure 7:
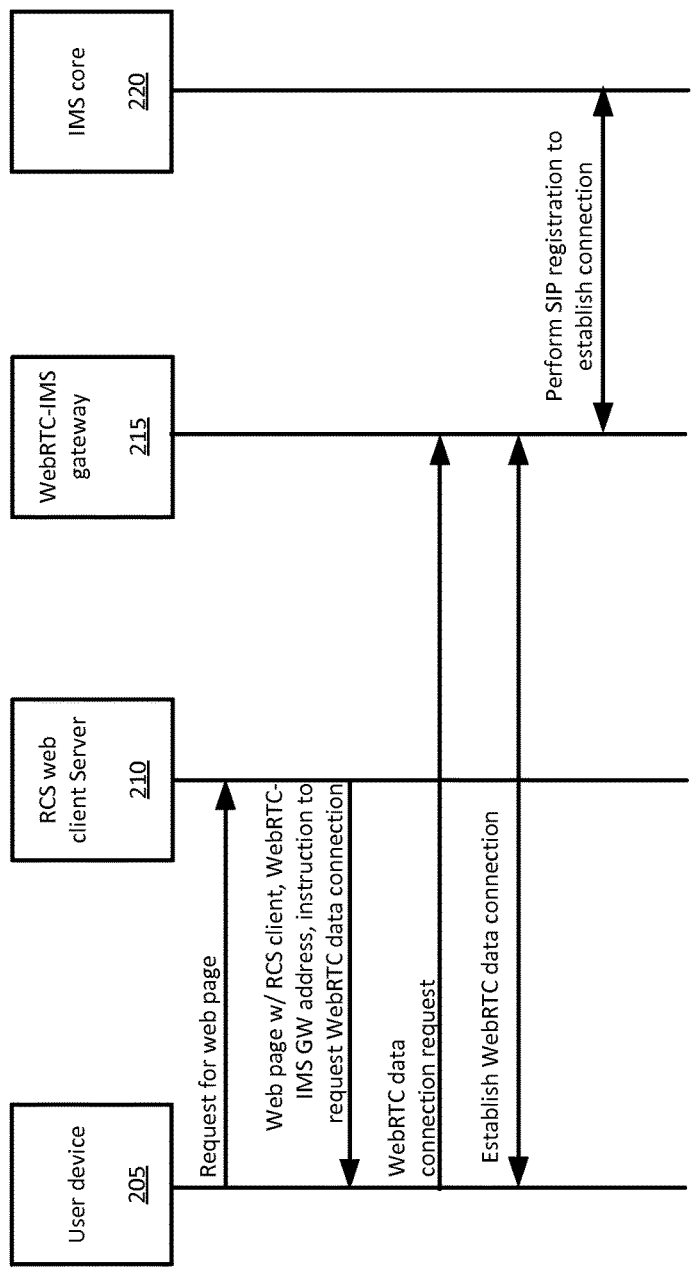
FIG. 7 illustrates an example signal flow for establishing a WebRTC connection between a WebRTC client and a WebRTC-IMS gateway, and eventually forming a data path between the client and an IMS core.

FIG. 7 illustrates an example signal flow for establishing a WebRTC connection between a WebRTC client and a WGW, and eventually forming a data path between the client an IMS core. Certain acts shown in FIG. 7 may be similar to one or more blocks described above with respect to FIGS. 3 and/or 4. As shown in FIG. 7, user device 205 may output a request (e.g., a HTTP request) for a web page. RCS web client server 210 may output a web page that includes an RCS client (e.g., code, such as HTML, JavaScript, and/or other code that implements the RCS client), an address (e.g., an IP address) of WGW 215, and an instruction to request a WebRTC data connection with WGW 215. Based on the instruction received from WGW 215, and using the received address of WGW 215, user device 205 may output a request for a WebRTC data connection to WGW 215. Based on this request, a WebRTC data connection may be established between user device 205 and WGW 215. Also, based on the request, WGW 215 may communicate with IMS core 220 using SIP signaling in order to establish a SIP connection with IMS core 220 (or, in some implementations, may communicate with one or more other devices in IMS core 220, such as RCS server 225, in order to establish a SIP connection with one or more other devices in IMS core 220).

Figure 8:
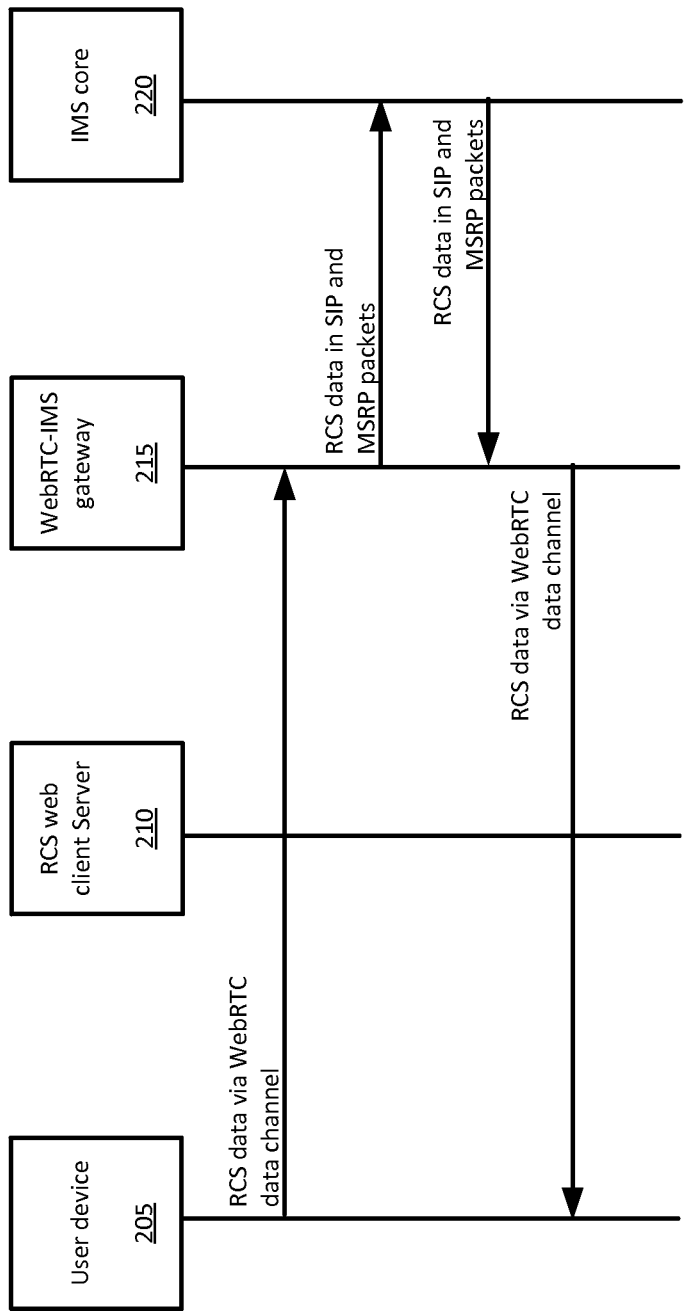
FIG. 8 illustrates an example signal flow for transmitting RCS data between an IMS core and a client via a WebRTC-IMS gateway.

FIG. 8 illustrates an example signal flow for transmitting RCS data between an IMS core and a client via a WGW. In some implementations, the communications shown in FIG. 8 assume an established data channel between user device 205 and WGW 215 (e.g., a WebRTC data channel), and between WGW 215 and IMS core 220 (e.g., a SIP data channel). For instance, these data channels may have been established according to the example communications shown in FIG. 7, and/or via another technique.

As shown, user device 205 may send RCS data via the WebRTC data channel to WGW 215. WGW 215 may send the RCS data via SIP and/or MSRP packets to IMS core 220. In some implementations, the data sent to IMS core 220 may be modified, as similarly shown in FIGS. 5A-5C and/or FIGS. 6A and 6B.

As also shown, IMS core 220 may send RCS data to WGW 215 via SIP and/or MSRP packets to WGW 215. WGW 215 may send the RCS data to user device 205 via the WebRTC data channel (e.g., after modifying the received data).

Figure 9:
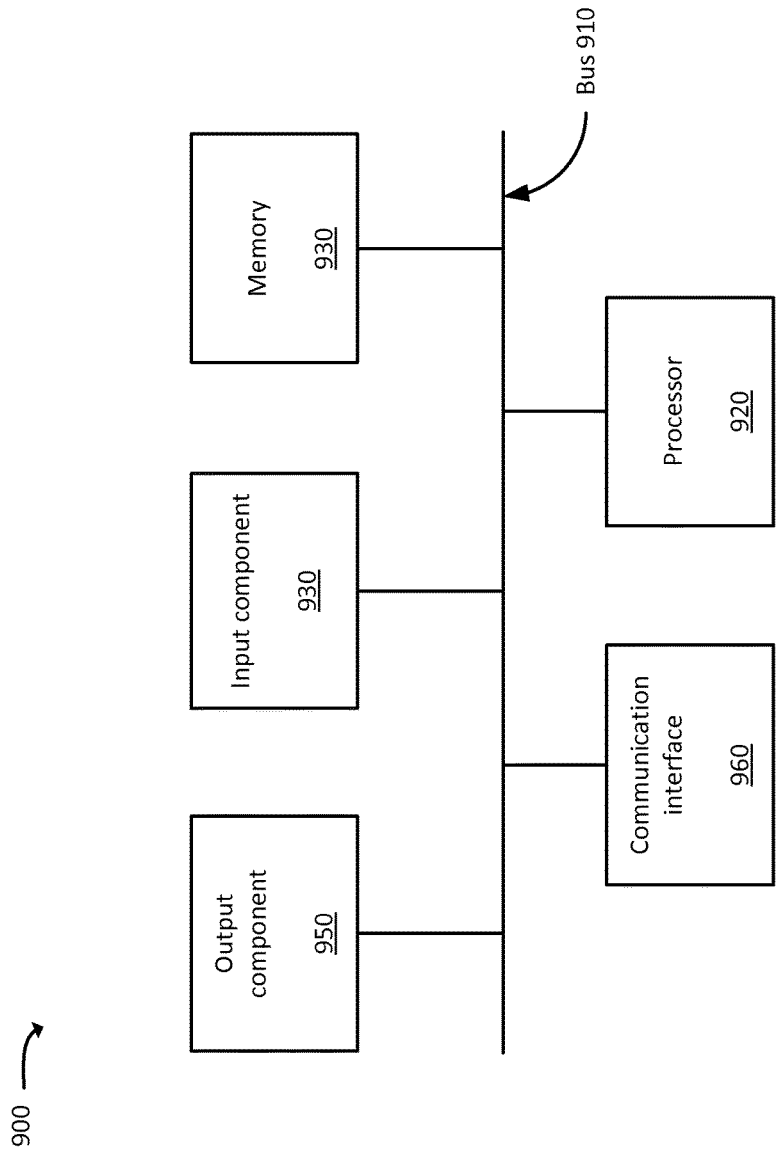
FIG. 9 illustrates example components of one or more devices, according to one or more implementations described herein.

FIG. 9 is a diagram of example components of device 900. One or more of the devices illustrated in FIG. 1, 2, 7, or 8 may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 3 and 4, the order of the blocks may be modified in other implementations. Further, non-dependent blocks may be performed in parallel.

Additionally, while example implementations are described above in the context of WebRTC and RCS, in practice, other services, protocols, and/or APIs may be implemented using similar techniques. For instance, in addition to, or in lieu of, a WebRTC DataChannel object, some implementations may use different object types or processes within the WebRTC standard (e.g., as defined by W3C), or a different standard altogether in order to implement a data channel. Furthermore, in addition to, or in lieu of, features provided by the RCS (e.g., as defined by documentation provided by GSMA), some implementations may use similar features (e.g., chat, file transfer, address book sync, etc.) provided by other standards. As another example, while FIGS. 5A-5C show MSRP information 510 and 525, in some implementations, the data packets shown in these figures may include SIP information in addition to, or in lieu of, MSRP information.

Furthermore, while certain protocol- or API-specific terms are used in above or in the drawings, in practice, other terms may be used to carry out similar functions. For example, while FIGS. 5A-5C include the abbreviations "Src" and "Dest" to indicate a source and a destination of data, in practice, other terms may be used (e.g., "To" and "From").

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
    receiving, by a gateway device and from a client device, a request to establish a connection between the gateway device and the client device, the request being based on a Web Real-Time Communication ("WebRTC") application programming interface ("API");
    establishing, by the gateway device and based on the request from the client device, a first data connection between the gateway device and the client device, the first data connection being based on the WebRTC API;
    establishing, by the gateway device, a second data connection between the gateway device and an Internet Protocol ("IP") Multimedia Subsystem ("IMS") core; and
    facilitating, by the gateway device, communications between the client device and the IMS core, the communications being based on a Rich Communication Services ("RCS") standard, the facilitating including:
        receiving a first data packet, that includes RCS payload information, from the client device via the first data connection,
        generating a second data packet based on the first data packet, the second data packet including:
            at least a portion of the RCS payload information,
            information identifying that a source of the second packet is the gateway device, and
            information identifying that a destination of the second packet is the IMS core,
        outputting communications, that are based on communications received from the client device via the first data connection, to the IMS core via the second data connection, wherein outputting communications to the IMS core includes outputting the second data packet to the IMS core, and
        outputting communications, that are based on communications received from the IMS core via the second data connection, to the client device via the first data connection, wherein outputting the communications, that are based on communications received from the IMS core via the second data connection, to the client device, includes:
            pushing one or more communications that are based on the RCS standard, received via the IMS core, to the client device via the first data connection.

2. The method of claim 1, wherein the second data connection is based on a Session Initiation Protocol standard.

3. The method of claim 1, wherein the second data packet further includes:
    information identifying that the RCS payload information is associated with the client device.

4. The method of claim 1, wherein generating the second data packet includes:
    adding header information to the first packet, the header information including the information identifying that a source of the second packet is the gateway device, and the information identifying that a destination of the second packet is the IMS core.

5. The method of claim 1, wherein the first data packet is based on a WebRTC standard, and
    wherein the second data packet is based on at least one of:
        a Session Initiation Protocol standard, or
        a Message Session Relay Protocol standard.

6. The method of claim 1, wherein the facilitating further includes:
    receiving a third data packet, that includes RCS payload information, from the IMS core via the second data connection,
    generating a fourth data packet based on the third data packet, the fourth data packet including:
        at least a portion of the RCS payload information,
        information identifying that a source of the fourth packet is the gateway device, and
        information identifying that a destination of the fourth packet is the client device,
    wherein outputting communications to the client device includes:
        outputting the fourth data packet to the client device.

7. The method of claim 1, wherein the first data connection is based on a DataChannel object, specified by the WebRTC API.

8. A gateway device, comprising:
    a memory device storing a set of computer-executable instructions; and
    one or more processors configured to execute the computer-executable instructions, wherein executing the computer-executable instructions causes the one or more processors to:

receive, from a client device, a request to establish a connection between the gateway device and the client device, the request being based on a Web Real-Time Communication ("WebRTC") application programming interface ("API");

establish, based on the request from the client device, a first data connection between the gateway device and the client device, the first data connection being based on the WebRTC API;

establish a second data connection between the gateway device and an Internet Protocol ("IP") Multimedia Subsystem ("IMS") core; and facilitate communications between the client device and the IMS core, the communications being based on a Rich Communication Services ("RCS") standard, wherein executing instructions to facilitate the communications further causes the one or more processors to:

receive a first data packet, that includes RCS payload information, from the client device via the first data connection, generate a second data packet based on the first data packet, the second data packet including:
at least a portion of the RCS payload information,
information identifying that a source of the second packet is the gateway device, and
information identifying that a destination of the second packet is the IMS core, output communications, that are based on communications received from the client device via the first data connection, to the IMS core via the second data connection, wherein when outputting the communications, that are based on communications received from the client device via the first data connection, to the IMS core, the one or more processors are to output the second data packet to the IMS core, and output communications, that are based on communications received from the IMS core via the second data connection, to the client device via the first data connection, wherein when outputting the communications, that are based on communications received from the IMS core via the second data connection, to the client device, the one or more processors are to:

push one or more communications that are based on the RCS standard, received via the IMS core, to the client device via the first data connection.

9. The gateway device of claim 8, wherein the second data connection is based on a Session Initiation Protocol standard.

10. The gateway device of claim 8, wherein when outputting the communications, that are based on communications received from the client device via the first data connection, to the IMS core, the one or more processors are to:

modify data packets, that include RCS communications and are based on the WebRTC API, to yield modified data packets that include RCS communications and are based on a Session Initiation Protocol ("SIP") standard or a Message Session Relay Protocol ("MSRP") standard, and output the modified data packets to the IMS core.

11. The gateway device of claim 10, wherein executing the instructions to modify the data packets further causes the one or more processors to:

add header information to the data packets that include RCS communications and are based on the WebRTC API, the header information including information identifying that a source of the modified packets is the gateway device, and the information identifying that a destination of the data packets, that include RCS communications and are based on the WebRTC API, is the IMS core.

12. The gateway device of claim 8, wherein the first data connection is based on a DataChannel object, specified by the WebRTC API.

13. The method of claim 1, wherein the pushing, of the one or more communications that are based on the RCS standard, is performed without a request, for the one or more communications that are based on the RCS standard, by the client device.

14. The gateway device of claim 8, wherein when outputting the communications, that are based on communications received from the IMS core via the second data connection, to the client device, the one or more processors are to:

modify data packets, that include RCS communications and are based on the SIP standard or the MSRP standard, to yield modified data packets that include RCS communications and are based on the WebRTC API standard.

15. The gateway device of claim 11, wherein the header information is based on at least one of:
the SIP standard, or
the MSRP standard.

16. A non-transitory computer-readable medium storing a set of processor-executable instructions, which, when executed by one or more processors of a gateway device, cause the one or more processors to:

receive, from a client device, a request to establish a connection between the gateway device and the client device, the request being based on a Web Real-Time Communication ("WebRTC") application programming interface ("API");

establish, based on the request from the client device, a first data connection between the gateway device and the client device, the first data connection being based on the WebRTC API;

establish a second data connection between the gateway device and an Internet Protocol ("IP") Multimedia Subsystem ("IMS") core; and facilitate communications between the client device and the IMS core, the communications being based on a Rich Communication Services ("RCS") standard, the processor-executable instructions to facilitate communications including processor-executable instructions to:

receive a first data packet, that includes RCS payload information, from the client device via the first data connection, generate a second data packet based on the first data packet, the second data packet including:
at least a portion of the RCS payload information,
information identifying that a source of the second packet is the gateway device, and
information identifying that a destination of the second packet is the IMS core, output communications, that are based on communications received from the client device via the first data connection, to the IMS core via the second data connection, wherein outputting communications to the IMS core includes outputting the second data packet to the IMS core, and output communications, that are based on communications received from the IMS core via the second data connection, to the client device via the first data connection, wherein the processor-executable instructions to output the communications, that are based on communications received from the IMS core via the second data connection, to the client device, include processor-executable instructions to:
push one or more communications that are based on the RCS standard, received via the IMS core, to the client device via the first data connection.

17. The non-transitory computer-readable medium of claim 16, wherein the second data connection is based on a Session Initiation Protocol standard.

18. The non-transitory computer-readable medium of claim 16, wherein the second data packet further includes:
information identifying that the RCS payload information is associated with the client device.

19. The non-transitory computer-readable medium of claim 16, wherein the processor-executable instructions, to generate the second data packet, include processor-executable instructions to:

add header information to the first packet, the header information including the information identifying that a source of the second packet is the gateway device, and the information identifying that a destination of the second packet is the IMS core.

20. The non-transitory computer-readable medium of claim 16, wherein the processor-executable instructions to facilitate communications further include processor-executable instructions to:
receive a third data packet, that includes RCS payload information, from the IMS core via the second data connection,
generate a fourth data packet based on the third data packet, the fourth data packet including:
at least a portion of the RCS payload information,
information identifying that a source of the fourth packet is the gateway device, and
information identifying that a destination of the fourth packet is the client device,
wherein the processor-executable instructions to output communications to the client device include processor-executable instructions to:
output the fourth data packet to the client device.

* * * * *